United States Patent
Booth et al.

(10) Patent No.: US 9,122,189 B2
(45) Date of Patent: Sep. 1, 2015

(54) SCAN UNIT FOR AN IMAGING DEVICE AND METHODS OF USING SAME

(71) Applicant: Lexmark International, Inc., Lexington, KY (US)

(72) Inventors: James Ronald Booth, Nicholasville, KY (US); Roger Steven Cannon, Nicholasville, KY (US); Daniel E. Pawley, Louisville, KY (US)

(73) Assignee: Lexmark International, Inc., Kentucky ( * ) Notice: Subject to any disclaimer, the term of this patent is extended or adjusted under 35 U.S.C. 154(b) by 0 days.

(21) Appl. No.: 14/215,801

(22) Filed: Mar. 17, 2014

(65) Prior Publication Data

US 2014/0267530 A1 Sep. 18, 2014

Related U.S. Application Data

(60) Provisional application No. 61/800,919, filed on Mar. 15, 2013.

(51) Int. Cl.

| B41J 2/385 | (2006.01) |
|---|---|
| G03G 13/04 | (2006.01) |
| G03G 15/04 | (2006.01) |
| H04N 1/047 | (2006.01) |
| H04N 1/113 | (2006.01) |
| H04N 1/12 | (2006.01) |
| G02B 26/10 | (2006.01) |
| G02B 17/02 | (2006.01) |

(52) U.S. Cl.
CPC ........ *G03G 15/04072* (2013.01); *G02B 26/105* (2013.01); *H04N 1/0473* (2013.01); *H04N 1/1135* (2013.01); *H04N 1/12* (2013.01); *G02B 17/026* (2013.01); *H04N 2201/0082* (2013.01); *H04N 2201/04762* (2013.01)

(58) Field of Classification Search
CPC .......... G03G 15/04072; H04N 1/0473; H04N 1/1135; H04N 1/12
USPC .................. 347/118, 119, 129, 130, 134, 135
See application file for complete search history.

(56) References Cited

U.S. PATENT DOCUMENTS

| 6,803,938 B2 | 10/2004 | Turner | |
|---|---|---|---|
| 7,507,951 B2 * | 3/2009 | Harris et al. | .................. 250/234 |

\* cited by examiner

*Primary Examiner* — Juanita D Jackson

(57) ABSTRACT

An imaging device scan unit, including an oscillator oscillating in a predetermined oscillation pattern; a light source generating a light beam for deflection by the oscillator and including a forward sweep portion when the oscillator moves in a first direction of the oscillation pattern and a reverse sweep portion when the oscillator moves in a second direction different from the first direction thereof; and components defining at least two optical paths for the light beam, the forward sweep portion of the light beam passes through a first optical path and the reverse sweep portion of the light beam passes through a second optical path, the second optical path reverses a sweep direction of the reverse sweep portion of the light beam such that the forward sweep portion and the reverse sweep portion of the light beam are in the substantially same direction when exiting the scan unit.

19 Claims, 12 Drawing Sheets

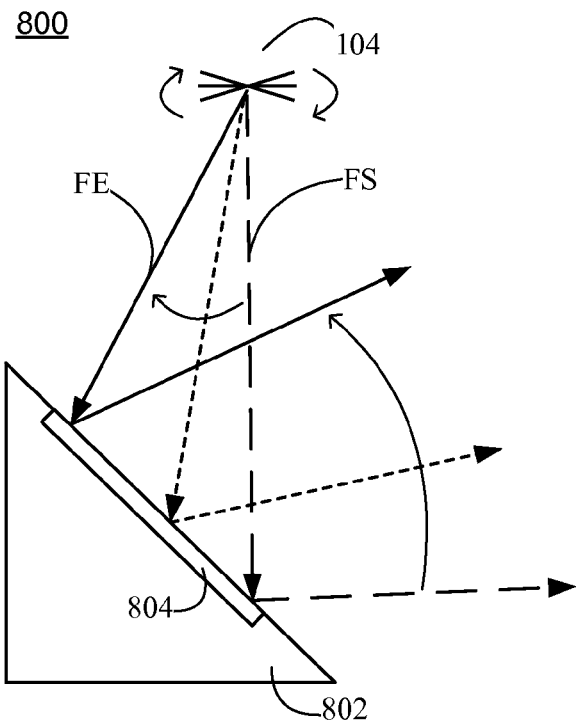 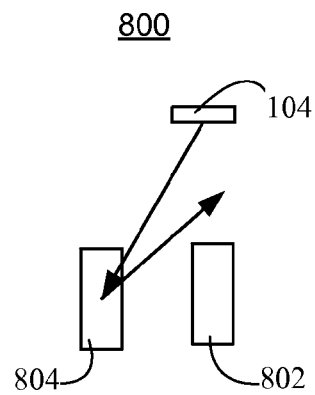
Fig. 8A
Fig. 8B
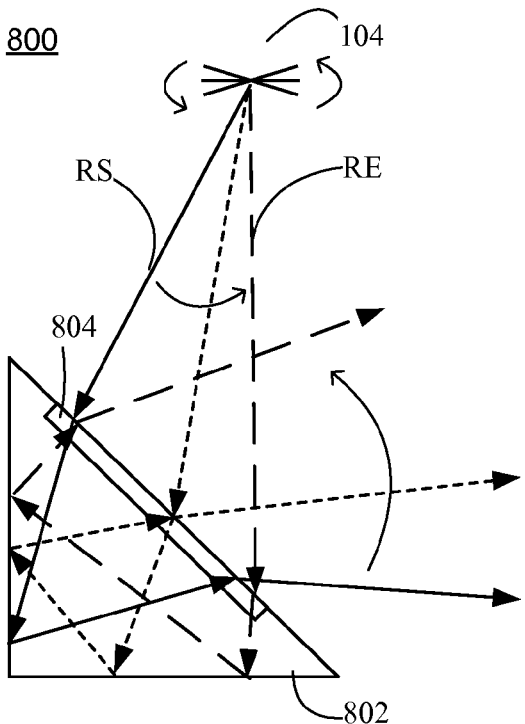 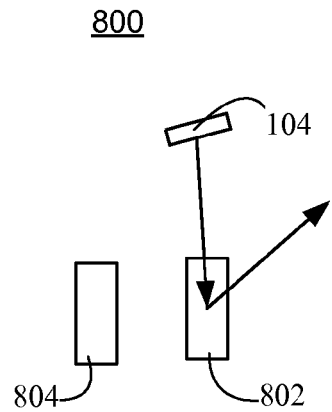
Fig. 9A
Fig. 9B

SCAN UNIT FOR AN IMAGING DEVICE AND METHODS OF USING SAME

CROSS REFERENCES TO RELATED APPLICATIONS

The present application claims priority under 35 U.S.C. 119(e) from U.S. provisional application No. 61/800,919, filed Mar. 15, 2013, entitled, "Utilizing Non-Linear Micro-Mirror Scanning to Eliminate or Reduce Zig-Zag Defects," the content of which is hereby incorporated by reference herein in its entirety.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present disclosure relates generally to scan units for image forming device, and particularly to scan units that reduce or otherwise eliminate distortion due to use of both forward and reverse sweeps of a laser beam.

2. Description of the Related Art

The thermal, power, start-up-time and acoustic advantages of micro-mirror-based laser scan units of electrophotographic imaging devices are well demonstrated when compared with scan units utilizing a polygonal mirror. A drawback in using the micro-mirror is its relatively low scan duty cycle, i.e., the time the light beam illuminates the photoconductive member versus the time the light beam illuminates areas off the photoconductive member. This relatively low duty cycle is driven by the sinusoidal motion of the micro-mirror in the scan direction and the practical need to have the light beam velocity in the scan direction acceptably high as it moves onto the photoconductive member.

A further loss of potential duty cycle is encountered by the "zig-zag" trajectory of the laser beam on the photoconductive member if both the left-to-right (forward) and the right-to-left (reverse) sweeps of the reflected laser beam are used to produce the latent image on the photoconductive member. Scan units that use both the forward and reverse sweeps to create scan lines on the photoconductive member, and print defects due to zig-zag distortion can be demonstrated with specific print patterns. These print patterns are not likely to be used by many print jobs, so this potential print defect is less of a concern for monochrome devices. With the need to increase print speed and/or resolution, or the desire to otherwise apply the advantages of a micro-mirror based scan units for color applications, eliminating zig-zag distortion is advantageous. For multi-emitter architectures to increase speed and/or resolution, the advantage is primarily to reduce the extreme scan spacing overlap. For color applications, the primary advantage is to enable overlapping halftone screens needed for color applications.

The root cause of zig-zag distortion is the use of both the forward and the reverse motion of an oscillating mirror to create scan lines on the photoconductive member, coupled with the substantially constant rotational speed thereof. As shown in FIG. 1, the location A in the process direction at which the beam exits the photoconductive member in a forward sweep (beam location 110 mm) versus where it enters on the immediately following reverse sweep at location B is estimated to be about one half of the distance from location C where the beam enters on the forward sweep (−110 mm beam location) versus where it exits at location D on the following reverse sweep. This change in sequential scan spacing is further exacerbated by a 2-on-2-off line pattern where the darkness of the left edge, center and right edge of a page are different.

If one looks at the impact of zig-zag distortion in a multi-emitter case, the issues are multiplied in that, for a two emitter scenario, the separation between the forward sweep of a first emitter versus the reverse sweep of the second emitter can, depending on the scan efficiency, go to zero or even negative. This situation is illustrated in FIG. 2. As can be seen, along the 0 mm scan direction, beam spacing is substantially uniform but along the +110 mm and −110 mm locations, the beam spacing is not at all uniform.

Based upon the foregoing, there is a need for an improved scan unit having a bidirectional scanning oscillator.

SUMMARY

Example embodiments overcome shortcomings seen in existing scan units for image forming devices and satisfy a need for scan units that reduce or substantially eliminate zig-zag distortion of scan units employing bidirectional scanning oscillators. According to an example embodiment, there is shown an imaging device including a controller; a photoconductive member coupled to the controller for moving the photoconductive member; and a scan unit coupled to the controller, the scan unit generating a light beam and repeatedly scanning at least portions of the light beam across the photoconductive member to form scan lines thereon. In an example embodiment, the scan unit includes a light source for emitting the light beam and an oscillator having a reflective surface which oscillates in a predetermined oscillation pattern and reflects the light beam, the light beam reflected by the reflective surface including forward sweep portions when the reflective surface moves in a first direction of the oscillation pattern and reverse sweep portions when the reflective surface moves in a second direction of the oscillation pattern, the scan unit being configured such that the scan lines formed by the forward sweep portions and scan lines formed by the reverse sweep portions of the light beam are substantially parallel to each other on the photoconductive member.

In an example embodiment, the predetermined oscillation pattern is substantially sinusoidal in both a scan direction and a process direction. The oscillator include at least one torsion bar defining a first oscillation axis about which the oscillator oscillates, and an actuator coupled to the at least one torsion bar for causing the torsion bar and the oscillator to modulate along a second oscillation axis.

In an embodiment, the scan unit includes optical components defining at least two optical paths for the light beam, the forward sweep portions of the light beam passes through a first optical path and the reverse sweep portions of the light beam passes through a second optical path, and the optical components defining the second optical path reverse a sweep direction of the corresponding reverse sweep portions of the light beam such that the forward sweep portions and the reverse sweep portions of the light beam are in the substantially same direction when exiting the scan unit. In this example embodiment, the optical components in the second optical path reverse the direction of the reverse sweep portions of the light beam and may include one or more parabolic mirrors or a prism.

BRIEF DESCRIPTION OF THE DRAWINGS

The above-mentioned and other features and advantages of the disclosed example embodiments, and the manner of attaining them, will become more apparent and will be better understood by reference to the following description of the disclosed example embodiments in conjunction with the accompanying drawings, wherein:

FIGS. 8A and 8B are top and side views, respectively, of a scan unit according to another example embodiment;

FIGS. 9A and 9B are top and side views, respectively, of the scan unit of FIGS. 8A and 8B;

DETAILED DESCRIPTION

Figure 1:
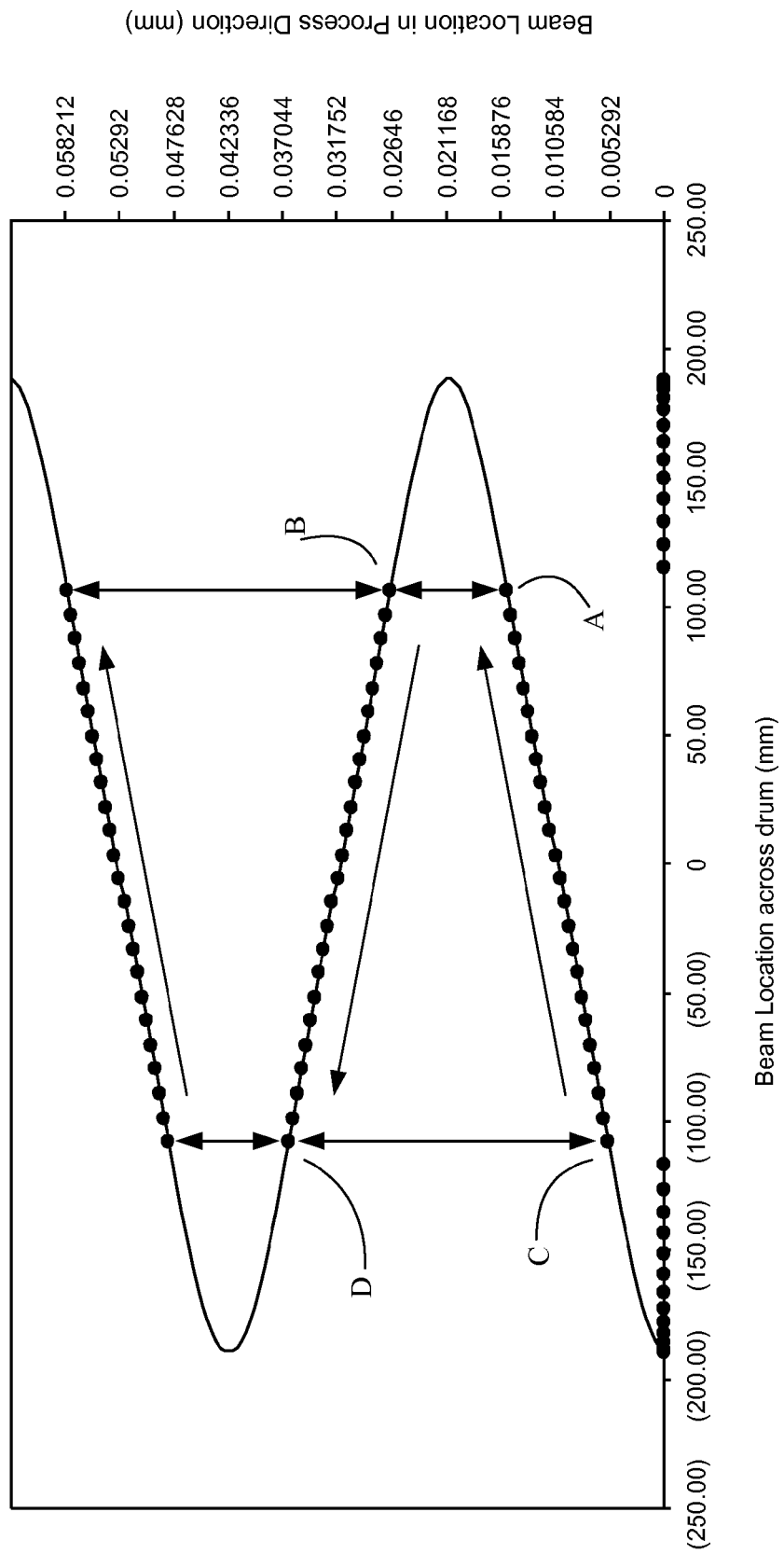
FIG. 1 depicts a simulation of light beam location across a photoconductive member.
Figure 2:
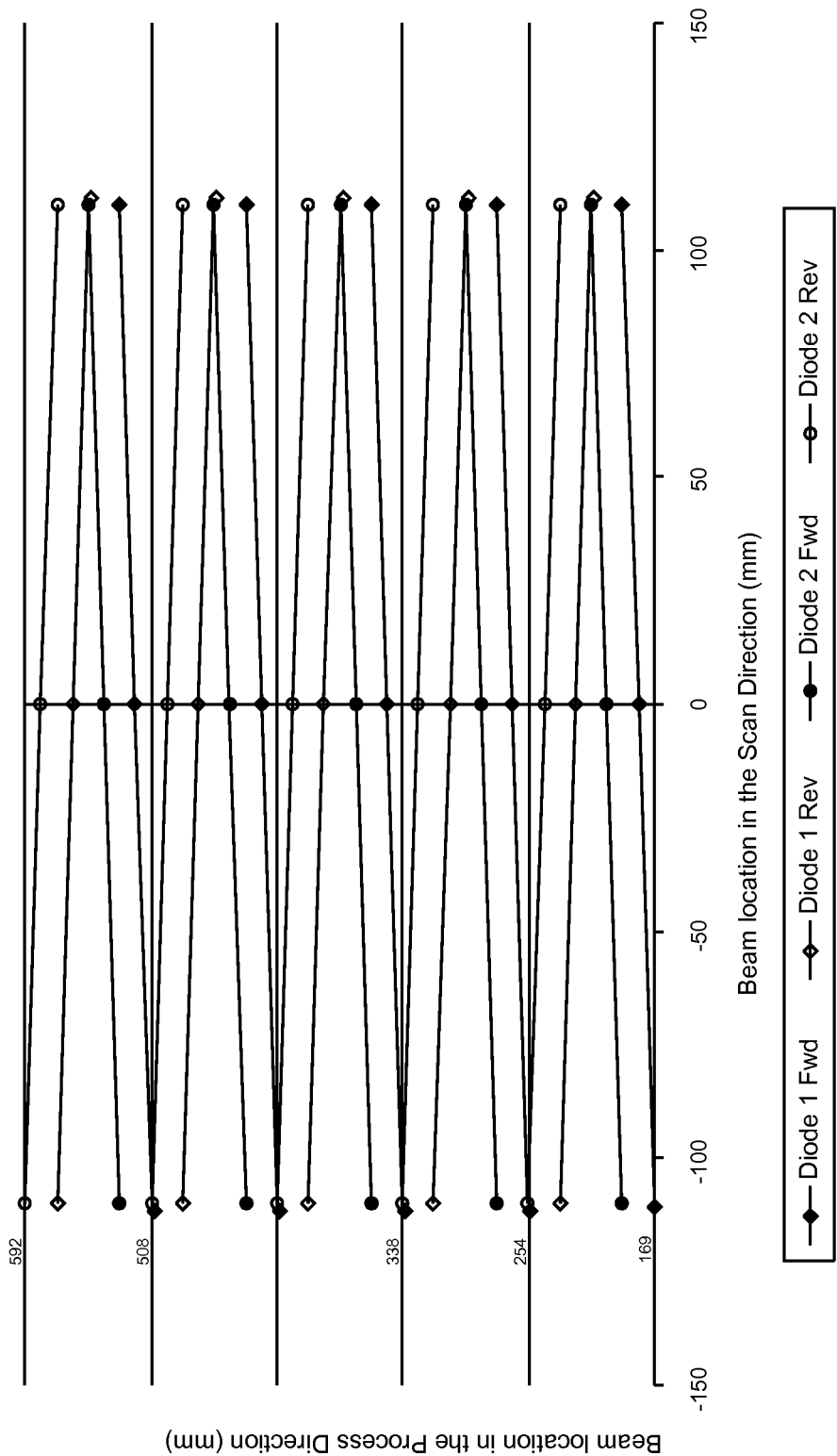
FIG. 2 depicts beam location across a photoconductive member for a multi-emitter architecture.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Spatially relative terms such as "top", "bottom", "front", "back" and "side", "above", "under", "below", "lower", "over", "upper", and the like, are used for ease of description to explain the positioning of one element relative to a second element. Terms such as "first", "second", and the like, are used to describe various elements, regions, sections, etc. and are not intended to be limiting. Further, the terms "a" and "an" herein do not denote a limitation of quantity, but rather denote the presence of at least one of the referenced item.

Furthermore, and as described in subsequent paragraphs, the specific configurations illustrated in the drawings are intended to exemplify embodiments of the disclosure and that other alternative configurations are possible.

Reference will now be made in detail to the example embodiments, as illustrated in the accompanying drawings. Whenever possible, the same reference numerals will be used throughout the drawings to refer to the same or like parts.

Figure 3A:
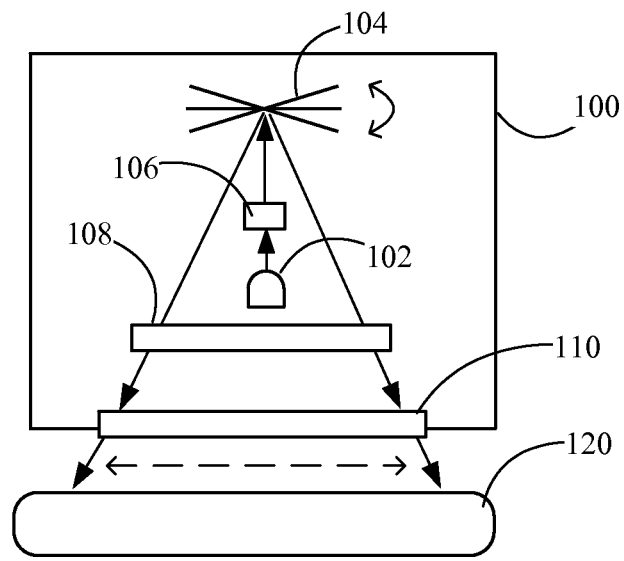
FIG. 3A is a diagram illustrating a scan unit generating a light beam.

Referring now to FIG. 3A, a schematic layout of scan unit 100 is shown according to an example embodiment of the present disclosure. Scan unit 100 may include a housing incorporating a light source 102, a scanning device 104, pre-scan optics 106, and post-scan optics 108.

Light source 102 may emit a light beam and may be implemented, for example, using a laser diode or any other suitable device for generating a beam of light. Scan unit 102 may also include driver circuitry (not shown) communicatively coupled to a controller for receiving video/image information and/or control data that may be utilized to set and/or vary the optical power used by light source 102.

Pre-scan optics 106 may include a lens for collimating or converging the light beam emitted by light source 102, and/or a pre-scan lens to direct and focus the light beam towards scanning device 104.

Scanning device 104 may include at least one reflective surface for receiving and reflecting light incident thereon. In an example embodiment, scanning device 104 may be a bidirectional scanning oscillator, such as a torsion oscillator or resonant galvanometer, controlled to operate bidirectionally at a scanning frequency to scan the light beam emitted by light source 104 for creating scan lines on the surface of photoconductive member 120. Scanning device 104 oscillates according to a predetermined oscillation pattern which generally includes a forward oscillation direction and a reverse oscillation direction such that the light beam includes forward sweep portions when reflected from scanning device 104 moving in the forward oscillation direction and also includes reverse sweep portions when reflected from scanning device 104 moving in the reverse oscillation direction.

Post-scan optics 108 may include a post-scan lens used to focus the light beam onto the surface of photoconductive member 120. In an example embodiment, the housing of scan unit 100 may include an opening and post-scan lens 110 may be disposed to cover the opening in order to prevent outside contaminants from entering therein. Scan unit 100 may also include synchronization components including horizontal synchronization (hsync) sensors (not shown) to intercept or pick off the light beam for synchronizing scan line operations.

FIGS. 4A-4B and 5A-5B illustrate a portion of scan unit 100 according to a first example embodiment. To address zig-zag distortion seen in imaging devices with scan units employing oscillators for creating scan lines that sweep the photoconductive member in forward and reverse scan directions, scan unit 100 of FIGS. 4A-4B and 5A-5B reverses one of the scan directions so that the scan lines generated by both of the forward and reverse oscillation directions of scanning device 104 are in the same direction. This is accomplished by having the forward sweep portions of the light beam traverse a first optical path in scan unit 100 and the reverse sweep portions of the light beam traverse a second optical path in scan unit 100 that is different from first optical path FP.

Figure 3B:
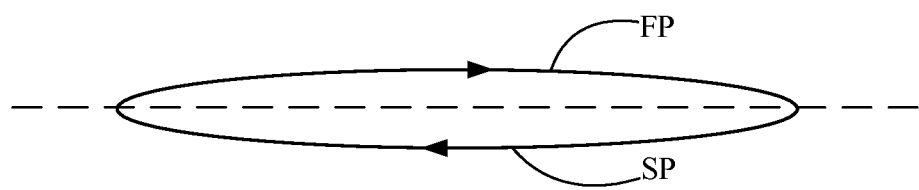
FIG. 3B depicts an oscillation pattern of a scanning device according to an example embodiment.

Causing the forward and reverse sweep portions of the light beam to take differing optical paths in scan unit 100 may be accomplished by controlling scanning device 104 so that it follows an oscillation pattern allowing for different optical path travel. In an example embodiment, scanning device 104 is controlled to have a substantially oval shaped oscillation pattern. FIG. 3B depicts such an oval shaped oscillation pattern in which the forward sweep portions are along first optical path FP and the reverse sweep portions are along second optical path SP. As shown, first optical path FP and second optical path SP are separated from each other. Such separation allows for optical components to be placed in forward sweep path FP and reverse sweep path RP having different optical functions from each other.

In the embodiment of FIGS. 4 and 5, scan unit 100 includes two pairs of mirrors. Each mirror pair includes a parabolic mirror and a circular mirror disposed adjacent the parabolic mirror. A first mirror pair includes parabolic mirror 402 and circular mirror 404, and a second mirror pair includes parabolic mirror 406 and circular mirror 408. Mirror pair 402, 404 may be disposed on one side of scanning device 104 and mirror pair 406, 408 disposed on the other. Circular mirrors 404, 408 are placed in first optical path FP of the light beam and parabolic mirrors 402, 406 are placed in second optical path SP.

Figure 4A:
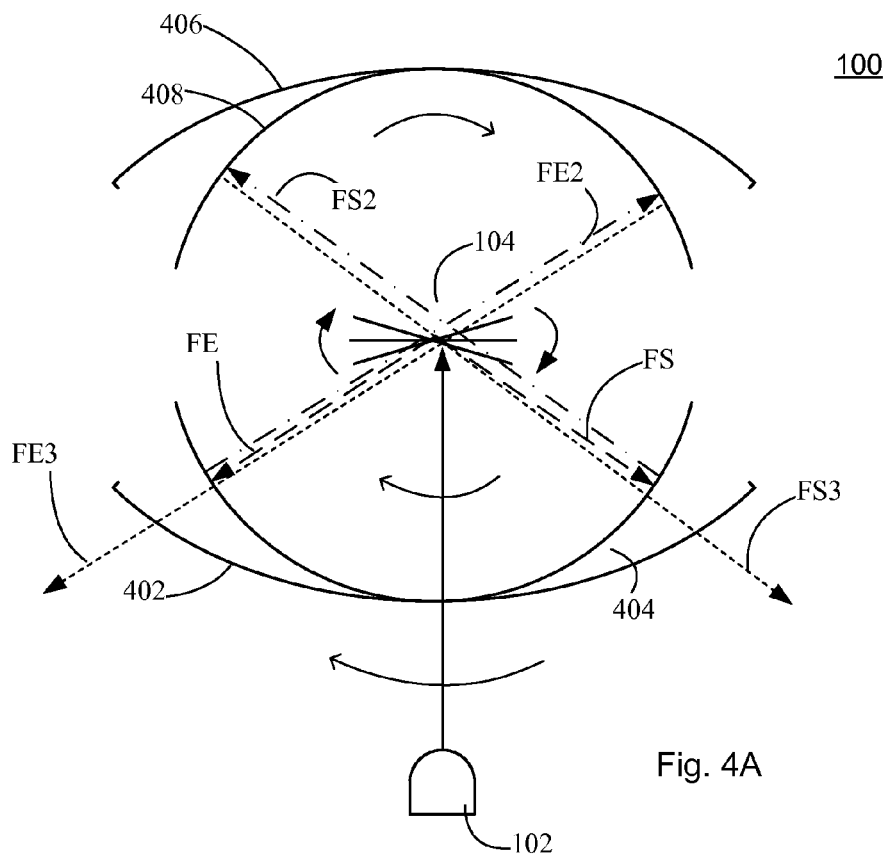
FIGS. 4A and 4B are top and side views, respectively, of a scan unit according to an example embodiment.
Figure 4B:
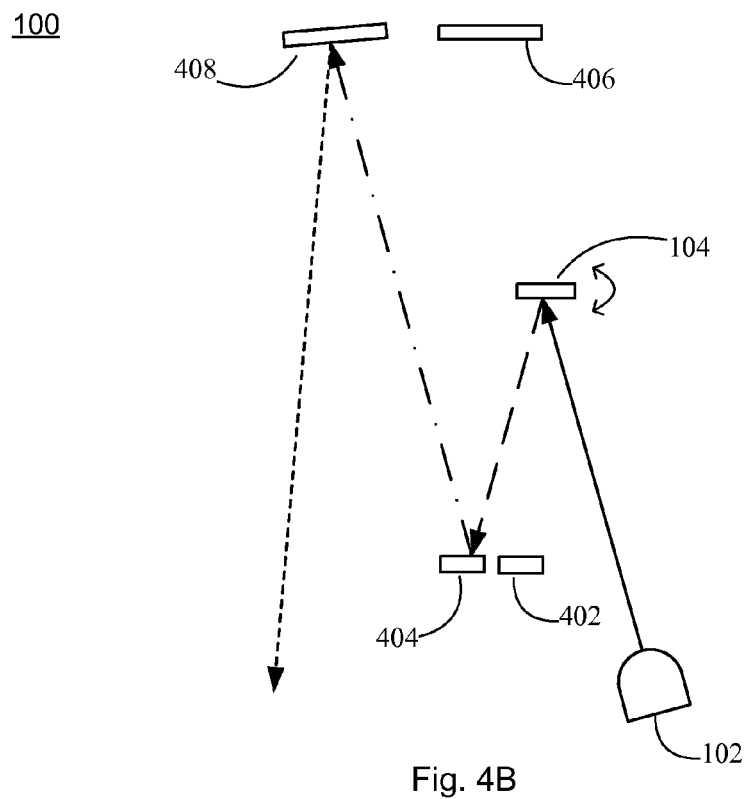

The operation of scan unit 100 will be described. As mentioned, scanning device 104 is controlled to have an oval shaped pattern so that the forward sweep portions of the reflected light beam assume first optical path FP and the reverse sweep portions of the reflected light beam assume second optical path SP. During the time scanning device 104 is controlled so as to rotate generally in the clockwise direction, as shown in FIGS. 4A and 4B, the light beam generated by light source 102 is reflected by scanning device 104 in the clockwise direction, between forward sweep start position FS and forward sweep end position FE. Scanning device 104 is controlled during this part of the oscillation pattern so that the reflected light beam is incident on and reflected by circular mirror 404. The light beam reflected by circular mirror 404 is directed towards circular mirror 408 in a clockwise sweep direction between forward sweep start position FS2 and forward sweep end position FE2. The light beam reflected by circular mirror 408 is reflected in a clockwise sweep direction between forward sweep start position FS3 and forward sweep end position FE3. In this way, the light beam leaving scan unit 100 includes forward sweep portions that are not reversed, relative to the forward sweep portions of the light beam reflected by scanning device 104.

Figure 5A:
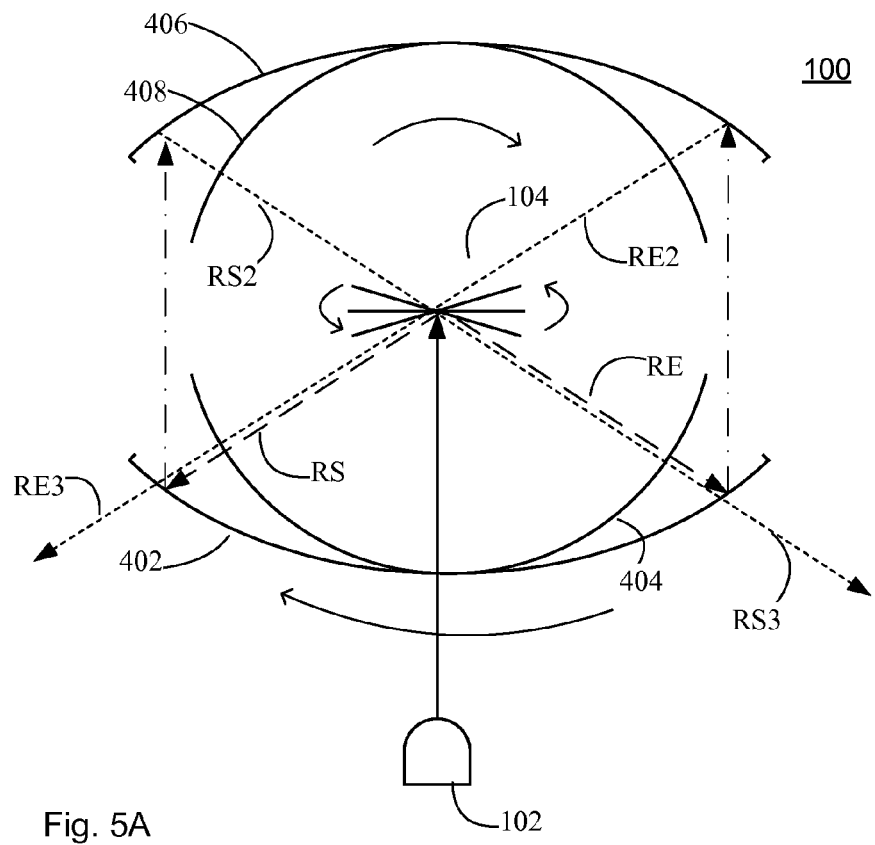
FIGS. 5A and 5B are top and side views, respectively, of the scan unit of FIGS. 4A and 4B.
Figure 5B:
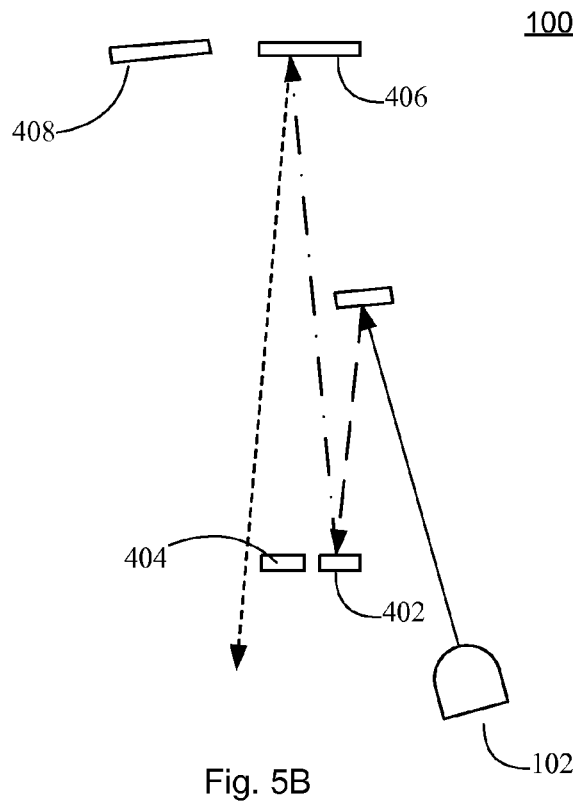

During the time scanning device 104 is controlled so as to rotate generally in the counter-clockwise direction, as shown in FIGS. 5A and 5B, the light beam generated by light source 102 is reflected by scanning device 104 in the counter-clockwise direction, between reverse sweep start position RS and reverse sweep end position RE. Scanning device 104 is controlled during this part of the oscillation pattern so that the reflected light beam is incident on and reflected by parabolic mirror 402. Due to the nature of light reflection from parabolic mirrors, the light beam reflected by parabolic mirror 402 is directed towards parabolic mirror 406 in a clockwise sweep direction between reverse sweep start position RS2 and reverse sweep end position RE2. The light beam reflected by parabolic mirror 406 is in a clockwise sweep direction between reverse sweep start position RS3 and reverse sweep end position RE3. In this way, the light beam leaving scan unit 100 includes reverse sweep portions that are reversed, relative to the reverse sweep portions of the light beam reflected by scanning device 104. The result is that the light beam exiting scan unit 100 (to be incident on photoconductive member 120) includes forward sweep portions and reverse sweep portions that are in the same sweep direction, thereby causing the sweep portions on photoconductive member 120 being parallel to each other so as to eliminate zig-zag distortion.

FIGS. 6A-6B and 7A-7B illustrate another approach to reversing one of the forward sweep portions and reverse sweep portions of the light beam that is reflected by scanning device 104, according to another example embodiment. In this embodiment, instead of using mirrors in the first optical path FP and the second optical path SP, a prism is employed in second optical path SP. Specifically, scan unit 500 includes scanning light source 102 and scanning device 104 as before. In addition, scan unit 500 includes positive lens 502, negative lens 504 and prism 506. Positive lens 502, which may be implemented with a collimation lens, receives the light beam which fans outwardly from scanning device 104 and changes the beam into substantially parallel rays. Negative lens 504 receives substantially parallel rays of a light beam and changes them to fan outwardly from the lens. Prism 506 rotates a received image. In an example embodiment, prism 506 is a dove prism.

Figure 6A:
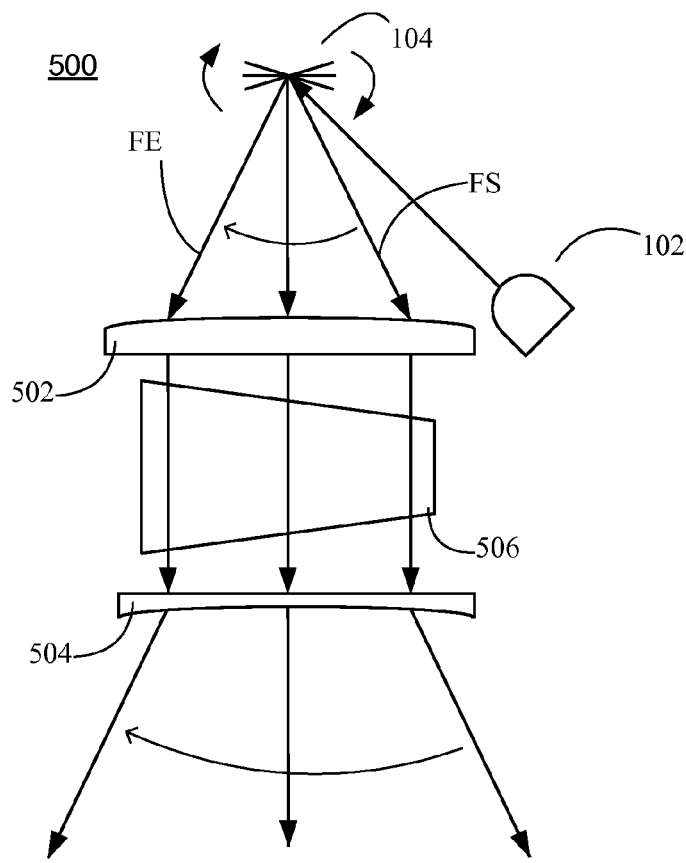
FIGS. 6A and 6B are top and side views, respectively, of a scan unit according to another example embodiment.
Figure 6B:
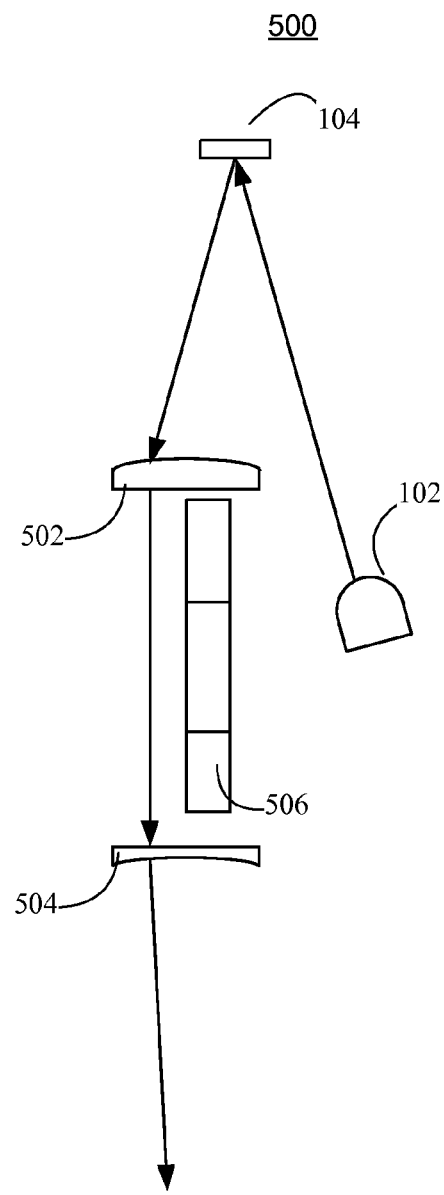

The operation of scan unit 500 will be described. Scanning device 104 is controlled to have an oval shaped oscillation pattern, for example, so that the forward sweep portions of the reflected light beam assume first optical path FP and the reverse sweep portions of the reflected light beam assume second optical path SP. During the time scanning device 104 is controlled so as to rotate generally in the clockwise direction, as shown in FIG. 6A, the light beam generated by light source 102 is reflected by scanning device 104 so as to sweep in the clockwise direction, between forward sweep start position FS and forward sweep end position FE in first optical path FP. Scanning device 104 is controlled during this part of the oscillation pattern so that the reflected light beam is incident on positive lens 502, which converts the fanned nature of the incident beam into parallel rays, as shown in FIG. 6A. First optical path FP is positioned so that the parallel rays from positive lens 502 are not incident on prism 506 but instead pass adjacent thereto, such as above or below, and are incident on negative lens 504. FIG. 6B illustrates the light beam rays passing adjacent to prism 506. Negative lens 504 receives the parallel rays of the reflected light beam and fans them outwardly, as shown in FIG. 6A. The fanned rays of the reflected light beam exit scan unit 500, towards the photoconductive member 120.

Figure 7A:
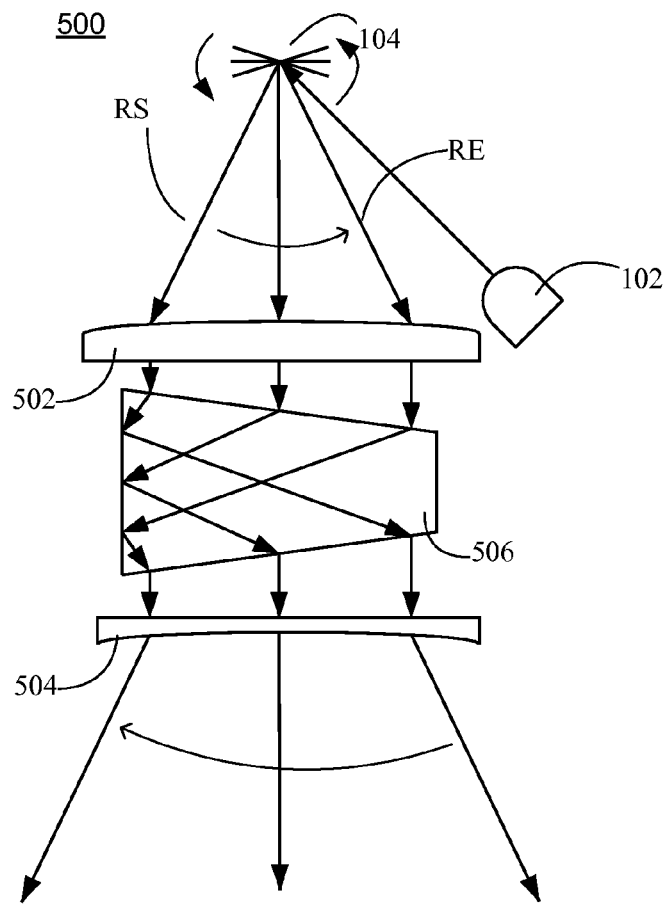
FIGS. 7A and 7B are top and side views, respectively, of the scan unit of FIGS. 6A and 6B.
Figure 7B:
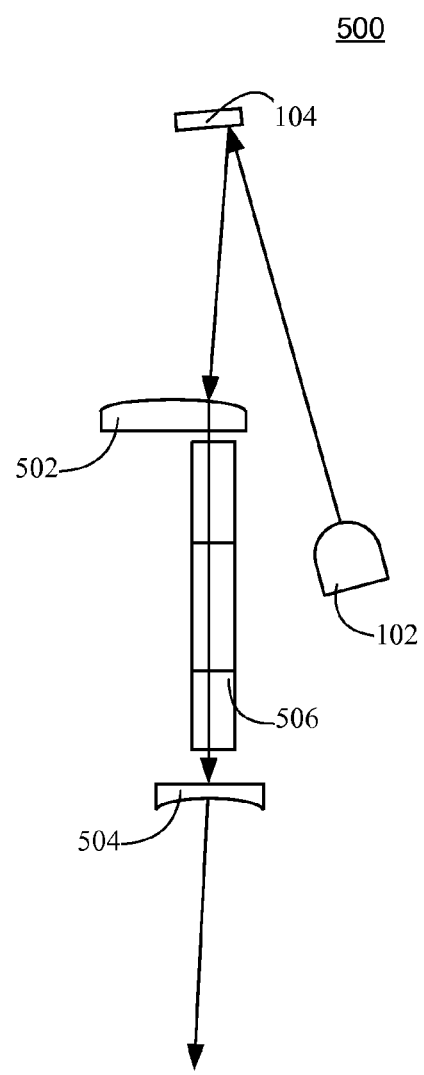

During the time scanning device 104 is controlled so as to rotate generally in the counter-clockwise direction, as shown in FIG. 7A, the light beam generated by light source 102 is reflected by scanning device 104 so as to sweep in the counter-clockwise direction, between reverse sweep start position RS and reverse sweep end position RE in second optical path SP. Scanning device 104 is controlled during this part of the oscillation pattern so that the reflected light beam is incident on positive lens 502, which converts the fanned nature of the incident beam into parallel rays, as shown in FIG. 7A. Second optical path SP includes prism 506 so that the parallel rays from positive lens 502 are incident on prism 506. FIG. 7A illustrates prism 506 rotating the rays so that the rays exiting prism 506 sweep in the opposite direction from the sweep of the light beam reflected by scanning device 104.

Negative lens 504 receives the parallel rays from prism 507 and fans them outwardly, as shown in FIG. 7A. The fanned rays of the reflected light beam exit scan unit 500, towards the photoconductive member 120. As noted, the light beam exiting scan unit 500 from second optical path SP have sweep portions that are in a reversed direction, relative to the direction of the sweep portions of the light beam reflected by scanning device 104. The result is that the light beam exiting scan unit 500 (to be incident on the photoconductive member 120) includes forward sweep portions and reverse sweep portions that are in the same sweep direction, thereby causing the sweep portions on the photoconductive member 120 being parallel to each other so as to eliminate zig-zag distortion.

FIGS. 8A-8B and 9A-9B illustrate another approach to reversing one of the forward sweep portions and reverse sweep portions of the light beam that is reflected by scanning device 104, according to yet another example embodiment. Scan unit 800 includes scanning device 104, prism 802 and mirror 804. In this embodiment, mirror 804 is included in first optical path FP and prism 802 is included in second optical path SP. Similar to prism 506, prism 802 rotates a received image.

The operation of scan unit 800 will be described. Scanning device 104 is controlled to have an oval shaped oscillation pattern, for example, so that the forward sweep portions of the reflected light beam assume first optical path FP and the reverse sweep portions of the reflected light beam assume a separate second optical path SP. During the time scanning device 104 is controlled so as to rotate generally in the clockwise direction, as shown in FIG. 8A, the light beam generated by light source 102 is reflected by scanning device 104 so as to sweep in the clockwise direction, between forward sweep start position FS and forward sweep end position FE in first optical path FP. Scanning device 104 is controlled during this part of the oscillation pattern so that the reflected light beam is incident on mirror 804, which reflects the light beam so as to have the sweep direction shown in FIG. 8A. The light beam reflected by mirror 804 exits scan unit 800 towards photoconductive member 120.

During the time scanning device 104 is controlled so as to rotate generally in the counter-clockwise direction, as shown in FIG. 9A, the light beam generated by light source 102 is reflected by scanning device 104 so as to sweep in the counter-clockwise direction, between reverse sweep start position RS and reverse sweep end position RE in second optical path SP. Scanning device 104 is controlled during this part of the oscillation pattern so that the reflected light beam is incident on prism 802, which rotates the light beam so as to have the sweep direction shown in FIG. 9A, having the same sweep direction as the sweep direction of the light beam in first optical path FP. The result is that the light beam exiting scan unit 800 (to be incident on the photoconductive member 120) includes forward sweep portions and reverse sweep portions that are in the same sweep direction, thereby causing the sweep portions on the photoconductive member being parallel to each other so as to eliminate zig-zag distortion.

Figure 10:
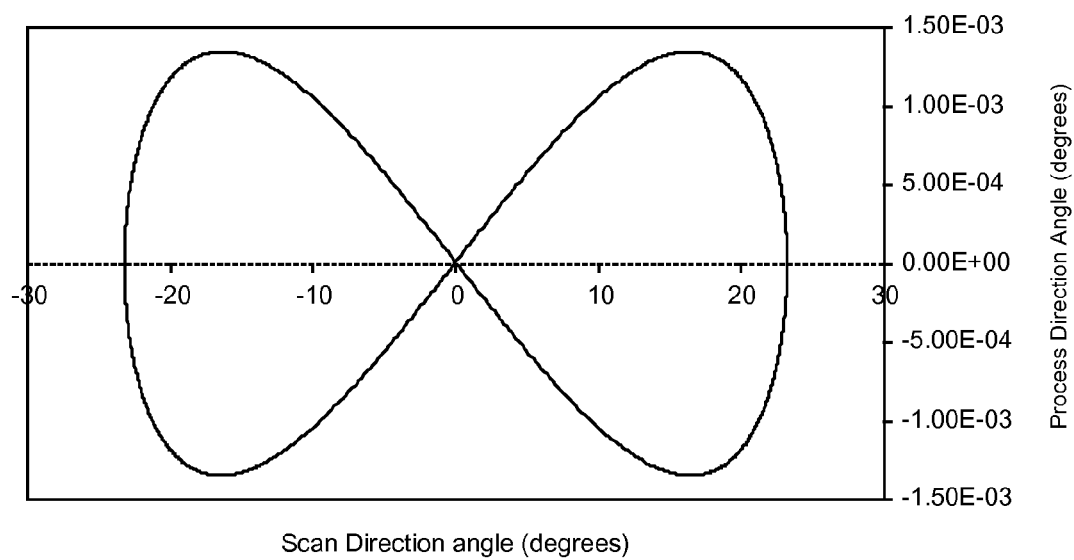
FIG. 10 depicts the oscillation pattern of a scan unit according to another example embodiment.
Figure 11:
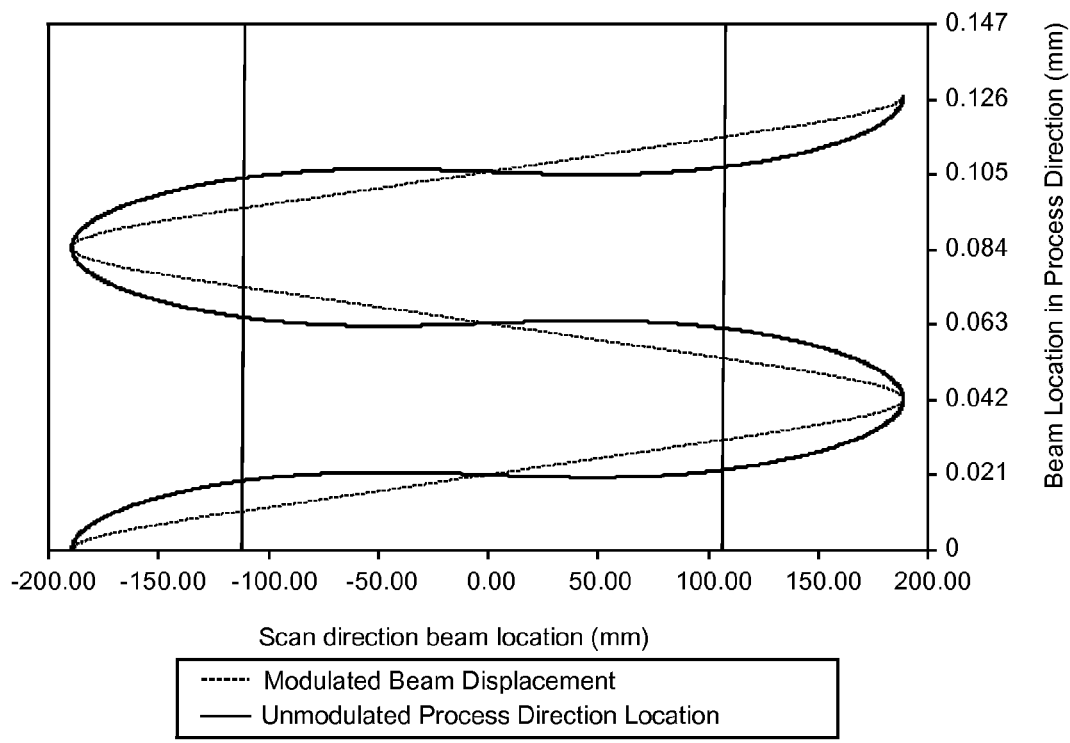
FIG. 11 depicts beam path location across a photoconductive member by a scan unit utilizing the oscillation pattern of FIG. 10.

Another technique involves controlling the movement of scanning device 104 to follow an oscillation pattern in which a sinusoidal pattern is applied along each of two oscillation axes. In an example embodiment, scanning device 104 is controlled to follow a Lissajous pattern, which may be described by the equations $x = A \sin(at+\delta)$ and $y = B \sin(bt)$, where, in this case, a=1 and b=2. FIG. 10 shows the oscillation pattern where both the scan (x) and process (y) direction trajectories are sinusoidal. It is noted that the oscillation in the process direction is much smaller in magnitude and twice the frequency as the oscillation in the scan direction. FIG. 11 illustrates the resulting light beam location on a photoconductive member 120 relative to a light beam that is not modulated in the process direction. In the drawing, the scan lines between the vertical dashed lines represent the portions of the light beam that are incident the photoconductive member 120. As can be seen, the forward and reverse scan lines are substantially parallel to each other, thereby substantially eliminating the occurrence of zig-zag distortion.

In this embodiment in which scanning device 104 is controlled to follow a Lissajous oscillation pattern, post-scan optics are not used to reverse a sweep portion of the light beam. Further, modulation in the process direction is a function of process speed. For an image forming device requiring process speeds either tightly grouped or proper fractions of the fastest supported process speed, the advantages offered by even a fixed modulation amplitude could be significant. The nearly parallel nature of the forward and reverse sweeps makes multiple emitter and color applications possible. Given the extremely small magnitude of the modulation in the process direction, the scan unit may utilize post-scan optics that would attenuate the process direction modulation, allowing a larger mirror deflection while still maintaining the same modulation at the photoconductive member 120.

Figure 12:
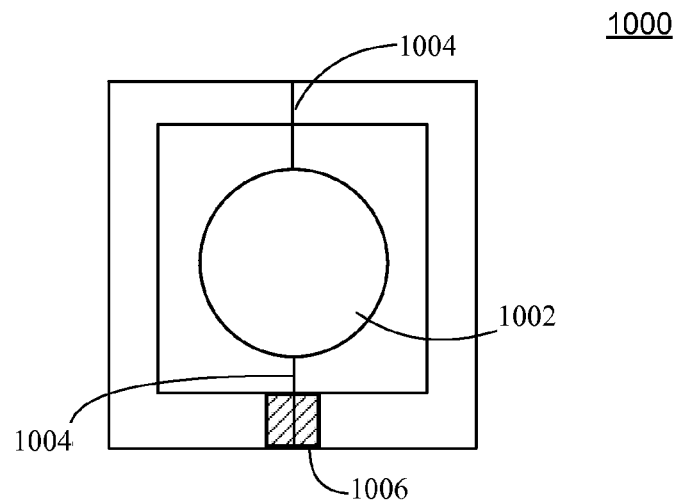
FIG. 12 illustrates a scanning device of a scan unit utilizing the oscillation pattern of FIG. 10, according to an example embodiment.

Creating the two-axis sinusoidal modulation may be accomplished, for example, through careful adjustment of the mass balance of scanning device 102 or through active motion in the process direction. The mechanical method would fix the design of scanning device 102 to a particular path length from scanning device 102 to the photoconductive member and process speed. While theoretically possible to actively achieve the desired modulation using a familiar 2-axis scanning device, such as those used in projector applications, the extremely small modulation angle makes a more specific design more desirable. According to an example embodiment, the torsion bar that is used to suspend the micro-mirror of a 1-axis scanning device is mounted to a structure with a very small maximum travel path that can be modulated. For example, a piezo-electric actuator may be coupled to a torsion bar to implement the desired small, rapid but controlled oscillatory motion. FIG. 12 illustrates a 1-axis scanning device 1000 in which the mirror 1002, such as a micro-mirror, is mounted to torsion bars 1004 so as to define an axis about which mirror 1002 oscillates. Actuator 1006, which may be a piezo-electric actuator, is coupled to one of the torsion bars 1004 so that actuator 1006 may be controlled to modulate torsion bar 1004 in a direction orthogonal to the axis formed by torsion bars 1004.

Figure 13:
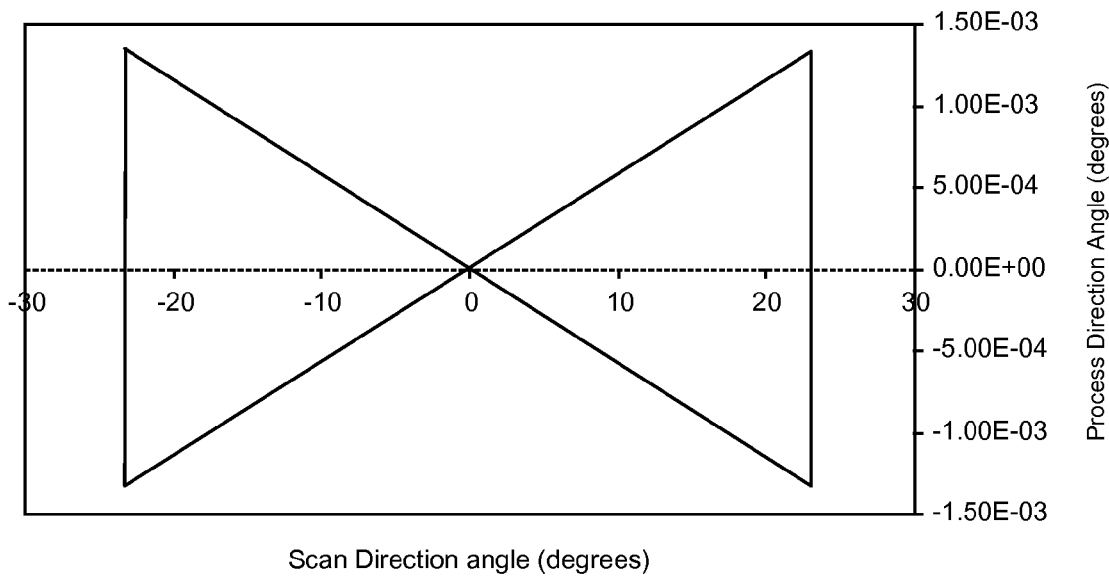
FIG. 13 depicts the oscillation pattern of a scan unit according to another example embodiment.
Figure 14:
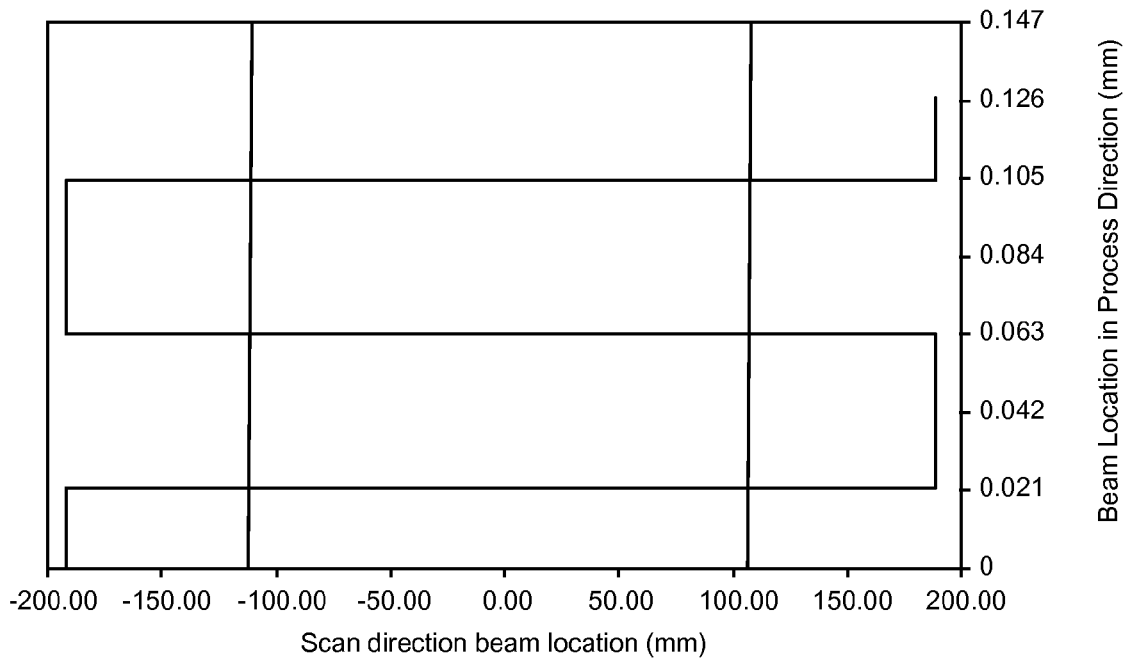
FIG. 14 depicts the approximate beam path location across a photoconductive member by a scan unit utilizing the oscillation pattern of FIG. 13.

Similar to the technique described with respect to FIGS. 10 and 11, another technique involves controlling the movement of scanning device 104 to follow an oscillation pattern as shown in FIG. 13. With scanning device 104 having the oscillation pattern of FIG. 13, scan lines provided on photoconductive member 120 in forward and reverse scan directions that are substantially parallel with each other, as shown in FIG. 14. Though the scan line locations in FIG. 14 on photoconductive member 120 are more idealized than the scan line locations illustrated in FIG. 11, control of scanning device 104 to follow the oscillation pattern of FIG. 13 would be more complex than the control of scanning device 104 following the oscillation pattern of FIG. 10. As a result, a scanning device 104 controlled with the Lissajous pattern of FIG. 10 may be a more practical implementation.

Figure 15:
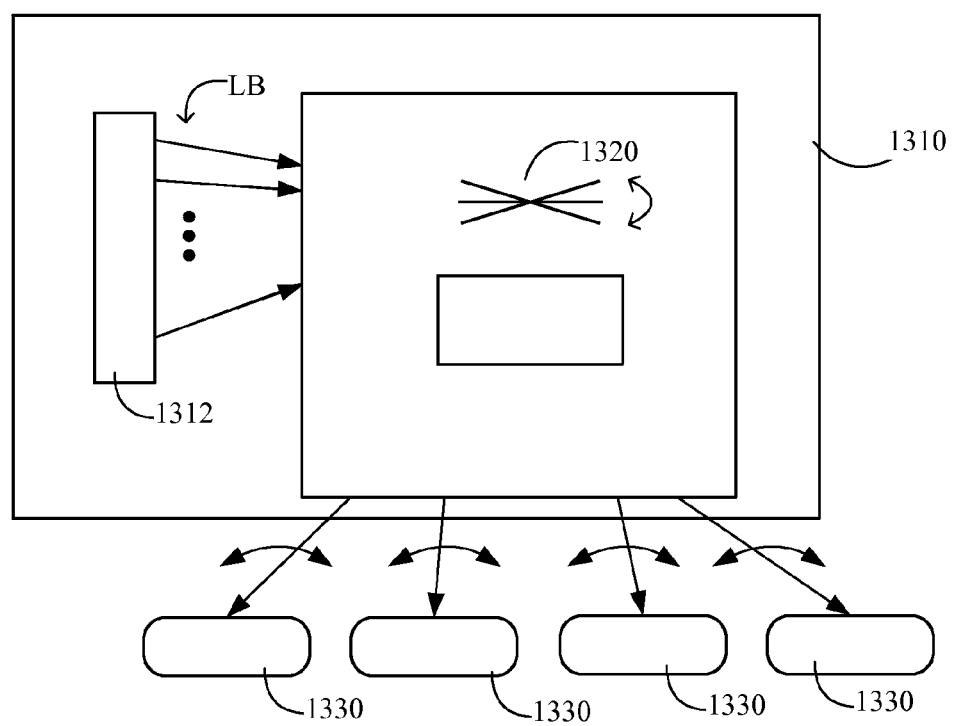
FIG. 15 is a block diagram of a scan unit according to an example embodiment.

As mentioned, because the scan units described above substantially reduce or eliminate zig-zag distortion seen in scan units having bidirectional scanning devices, bidirectional scanning devices are more easily implemented in multi-emitter and color applications. FIG. 15 illustrates such an application in which a scan unit 1310 includes light source 1312, such as a module having multiple LEDs, which generates at least two light beams LB for reflection by scanning device 1320 towards one or more photoconductive members 1330. The number of photoconductive members 1330 depends upon the particular application. A single photoconductive member 1330 may be used in a monochrome imaging device and multiple photoconductive members 1330, such as four, may be used in a color imaging device. Scan unit 1310 may utilize optical components, such as mirrors (circular, parabolic or planar), prisms or the like as described above depending upon the particular scan unit that is selected. Alternatively, for use in a color imaging device, scan unit 1310 may utilize four scanning devices 1320, one for generating scan lines on each photoconductive member 1330.

It is understood that the scan units described herein may utilize additional components, such as optical components, that are not shown or illustrated, for controlling or otherwise directing light beams to the photoconductive member(s).

Figure 16:
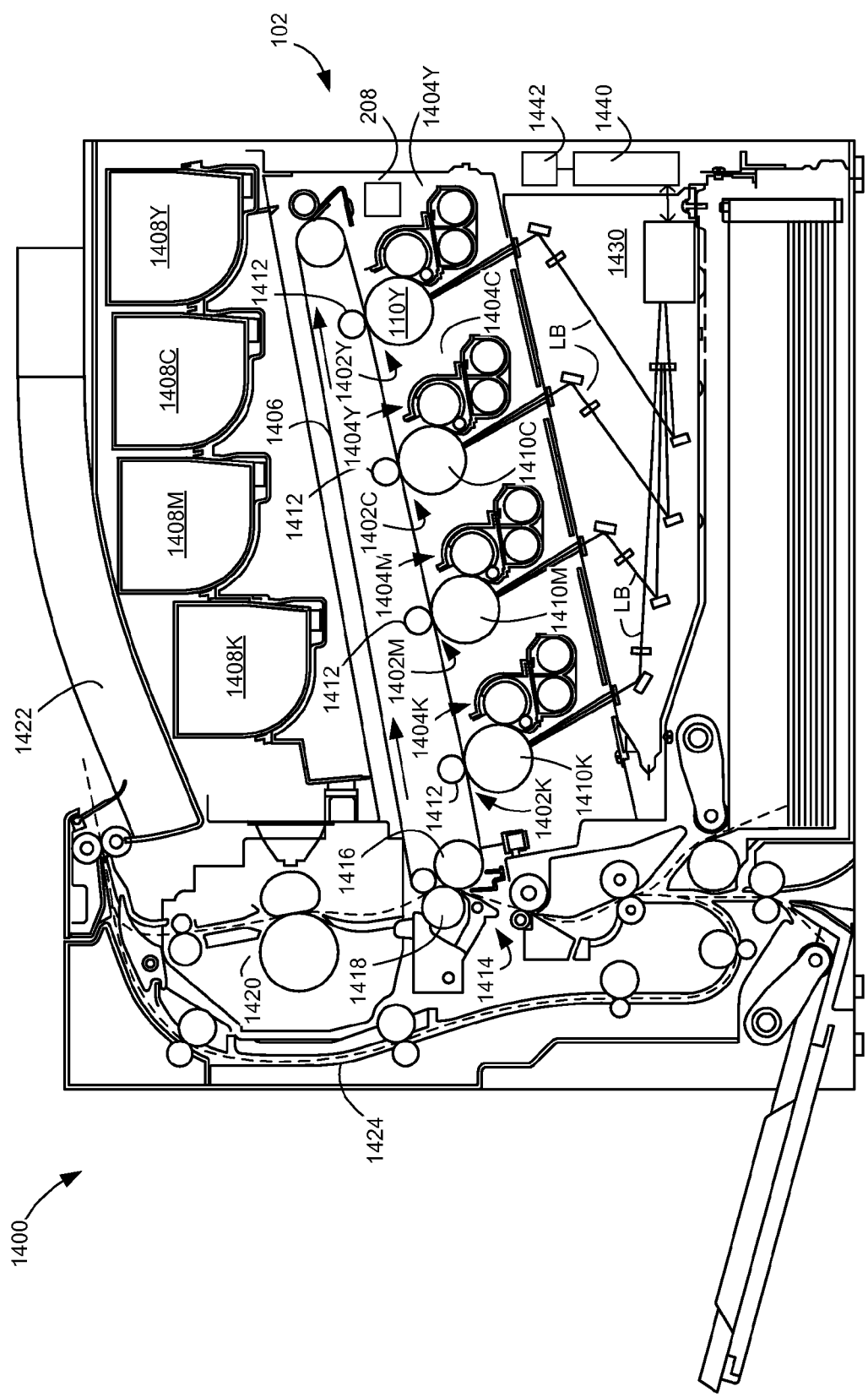
FIG. 16 is a side elevational view of an image forming device utilizing a scan unit of FIG. 15, according to an example embodiment.

FIG. 16 depicts a color image forming device 1400 which incorporates a scan unit described above. Image forming device 1400 includes a first toner transfer area 1402 having four developer units 1404 that substantially extend from one end of image forming device 100 to an opposed end thereof. Developer units 1404 are disposed along an intermediate transfer member (ITM) 1406. Each developer unit 1404 holds a different color toner. The developer units 1404 may be aligned in order relative to the direction of the ITM 1406 indicated by the arrows in FIG. 14, with the yellow developer unit 1404Y being the most upstream, followed by cyan developer unit 1404C, magenta developer unit 1404M, and black developer unit 1404K being the most downstream along ITM 1406.

Each developer unit 1404 is operably connected to a toner reservoir 1408 for receiving toner for use in a printing operation. Each toner reservoir 1408 is controlled to supply toner as needed to its corresponding developer unit 1404. Each developer unit 1404 is associated with a photoconductive member 1410 that receives toner therefrom during toner development to form a toned image thereon. Each photoconductive member 1410 is paired with a transfer member 1412 for use in transferring toner to ITM 1406 at first transfer area 102.

During color image formation, the surface of each photoconductive member 110 is charged to a specified voltage, such as −800 volts, for example. At least one laser beam LB from a printhead or laser scanning unit (LSU) 130 is directed to the surface of each photoconductive member 1410 and discharges those areas it contacts to form a latent image thereon. In one embodiment, areas on the photoconductive member 1410 illuminated by the laser beam LB are discharged to approximately −100 volts. The developer unit 1404 then transfers toner to photoconductive member 1410 to form a toner image thereon. The toner is attracted to the areas of the surface of photoconductive member 1410 that are discharged by the laser beam LB from scan unit 1430. Scan unit 1430 may incorporate any of the scan units described herein.

ITM 1406 is disposed adjacent to each of developer unit 1404. In this embodiment, ITM 1406 is formed as an endless belt disposed about a drive roller and other rollers. During image forming operations, ITM 1406 moves past photoconductive members 1410 in a clockwise direction as viewed in FIG. 1. One or more of photoconductive members 1410 applies its toner image in its respective color to ITM 1406. For mono-color images, a toner image is applied from a single photoconductive member 1410K. For multi-color images, toner images are applied from two or more photoconductive members 1410. In one example embodiment, a positive voltage field formed in part by transfer member 1412 attracts the toner image from the associated photoconductive member 1410 to the surface of moving ITM 1406.

ITM 1406 rotates and collects the one or more toner images from the one or more developer units 1404 and then conveys the one or more toner images to a media sheet at a second transfer area 1414. Second transfer area 114 includes a second transfer nip formed between at least one back-up roller 1416 and a second transfer roller 1418.

A fuser assembly 1420 is disposed downstream of second transfer area 1414 and receives media sheets with the unfused toner images superposed thereon. In general, fuser assembly 1420 applies heat and pressure to the media sheets in order to fuse toner thereto. After leaving fuser assembly 1420, a media sheet is either deposited into output media area 1422 or enters duplex media path 1424 for transport to second transfer area 1414 for imaging on a second surface of the media sheet.

Image forming device 1400 is depicted in FIG. 14 as a color laser printer in which toner is transferred to a media sheet in a two step operation. Alternatively, image forming device 1400 may be a color laser printer in which toner is transferred to a media sheet in a single step process—from photoconductive members 1410 directly to a media sheet. In another alternative example embodiment, image forming device 1400 may be a monochrome laser printer which utilizes only a single developer unit 1404 and photoconductive member 1410 for depositing black toner directly to media sheets. Further, image forming device 1400 may be part of a multi-function product having, among other things, an image scanner for scanning printed sheets.

Image forming device 1400 further includes a controller 1440 and memory 1442 communicatively coupled thereto. In addition to being coupled to and controlling scan unit 1430, controller 1440 may also be coupled to components and modules in image forming device 1400 for controlling the same. For instance, controller 1440 may be coupled to toner reservoirs 1408, developer units 1404, photoconductive members 1410, fuser assembly 1420, as well as to motors (not shown) for imparting motion thereto. Further, controller 1440 is associated with heat control circuitry 1444 that is coupled to fuser assembly 1420 to control the generation of heat used to fuse toner to sheets of media. It is understood that controller 1440 may be implemented as any number of controllers and/or processors for suitably controlling image forming device 1400 to perform, among other functions, printing operations.

The description of the details of the example embodiments have been described using imaging devices. However, it will be appreciated that the teachings and concepts provided herein may also be applicable to other relatively stationary computing devices deployed in a particular environment.

The foregoing description of several example embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An imaging device, comprising:
 a controller;
 a photoconductive member coupled to the controller for moving the photoconductive member; and
 a scan unit coupled to the controller, the scan unit generating a light beam and repeatedly scanning portions of the light beam across the photoconductive member to form scan lines thereon, the scan unit including:
a light source for emitting the light beam; and
an oscillator having a reflective surface which oscillates in a predetermined oscillation pattern and reflects the light beam, the light beam reflected by the reflective surface including forward sweep portions when the reflective surface moves in a first direction of the oscillation pattern and reverse sweep portions when the reflective surface moves in a second direction of the oscillation pattern, the scan unit being configured such that the scan lines formed by the forward sweep portions and scan lines formed by the reverse sweep portions of the light beam are substantially parallel to each other on the photoconductive member.

2. The imaging device of claim 1, wherein the predetermined oscillation pattern is substantially sinusoidal in both a scan direction and a process direction.

3. The imaging device of claim 1, wherein the oscillator comprises at least two torsion bars defining an oscillation axis about which the oscillator oscillates, and an actuator coupled to at least one of the torsion bars for causing the at least one torsion bar to modulate from the oscillation axis.

4. The imaging device of claim 1, wherein the scan unit comprises optical components defining at least two optical paths for the light beam, the forward sweep portions of the light beam passes through a first optical path and the reverse sweep portions of the light beam passes through a second optical path, optical components defining the second optical path reverse a sweep direction of the corresponding reverse sweep portions of the light beam such that the forward sweep portions and the reverse sweep portions of the light beam are in the substantially same direction when exiting the scan unit.

5. The imaging device of claim 4, wherein the optical components defining the first optical path comprise at least two mirrors of a first mirror type, and the optical components defining the second optical path comprise at least two mirrors of a second mirror type, the second mirror type being different from the first mirror type.

6. The imaging device of claim 5, wherein the second mirror type comprises parabolic minors and the first mirror type comprises circular mirrors.

7. The imaging device of claim 4, wherein the optical components of the second optical path comprises a prism, the prism reversing the sweep direction of the reverse sweep portions of the light beam.

8. The imaging device of claim 7, wherein the prism comprises a dove prism.

9. The imaging device of claim 1, wherein the predetermined oscillation pattern comprises a substantially oval oscillation pattern.

10. The imaging device of claim 1, wherein the predetermined oscillation pattern comprises a Lissajous oscillation pattern.

11. A scan unit for an imaging device, comprising:
an oscillator having a reflective surface which oscillates in a predetermined oscillation pattern;
at least one light source, each light source generating a light beam for deflection by the reflective surface of the oscillator, the light beam including a forward sweep portion when the reflective surface moves in a first direction of the oscillation pattern and a reverse sweep portion when the reflective surface moves in a second direction of the oscillation pattern different from the first direction thereof; and
optical components defining at least two optical paths for each light beam, the forward sweep portion of the light beam passes through a first optical path and the reverse sweep portion of the light beam passes through a second optical path, one or more of the optical components defining the second optical path reverses a sweep direction of the reverse sweep portion of the light beam such that the forward sweep portion and the reverse sweep portion of the light beam are in the substantially same direction when exiting the scan unit.

12. The scan unit of claim 11, wherein one or more optical components defining the first optical path comprises at least two mirrors of a first mirror type, and the one or more optical components defining the second optical path comprises at least two mirrors of a second mirror type, the second mirror type being different from the first mirror type.

13. The scan unit of claim 12, wherein the first mirror type comprises a circular mirror.

14. The scan unit of claim 12, wherein the second mirror type comprises a parabolic mirror.

15. The scan unit of claim 11, wherein the predetermined oscillation pattern comprises a substantially oval oscillation pattern.

16. The scan unit of claim 11, wherein the one or more of the optical components defining the second optical path comprises a prism, the prism reversing the sweep direction of the corresponding sweep portion of the light beam.

17. The scan unit of claim 16, wherein the prism comprises a dove prism.

18. The scan unit of claim 17, wherein one or more optical components defining the first optical path comprises a mirror.

19. The scan unit of claim 11, wherein an optical component defining the first optical path comprises a mirror, and the one or more components defining the second optical path comprises a prism.

* * * * *